United States Patent
Radeva et al.

(10) Patent No.: US 9,230,163 B2
(45) Date of Patent: Jan. 5, 2016

(54) CASCADE ANALYSIS FOR INTESTINAL CONTRACTION DETECTION

(71) Applicant: GIVEN IMAGING LTD., Yoqneam (IL)

(72) Inventors: Petia Radeva, Barcelona (ES); Jordi Vitria, Barcelona (ES); Fernando Vilarino, Lugo (ES); Panagiota Spyridonos, Patras (GR); Fernando Azpiroz, Barcelona (ES); Juan Malagelada, Barcelona (ES); Fosca De Iorio, London (GB); Anna Accarino, Barcelona (ES)

(73) Assignee: GIVEN IMAGING LTD., Yoqneam (IL)

( * ) Notice: Subject to any disclaimer, the term of this patent is extended or adjusted under 35 U.S.C. 154(b) by 411 days.

(21) Appl. No.: 13/892,742

(22) Filed: May 13, 2013

(65) Prior Publication Data

US 2013/0243286 A1 Sep. 19, 2013

Related U.S. Application Data

(63) Continuation of application No. 12/282,700, filed as application No. PCT/IL2007/000323 on Mar. 13, 2007, now Pat. No. 8,441,530.

(60) Provisional application No. 60/781,372, filed on Mar. 13, 2006, provisional application No. 60/798,335, filed on May 8, 2006, provisional application No. 60/801,409, filed on May 19, 2006, provisional application No. 60/812,631, filed on Jun. 12, 2006, provisional application No. 60/812,611, filed on Jun. 12, 2006.

(51) Int. Cl.
*H04N 7/18* (2006.01)
*G06K 9/00* (2006.01)
*G06T 7/00* (2006.01)

(52) U.S. Cl.
CPC ......... *G06K 9/00536* (2013.01); *G06T 7/0012* (2013.01); *G06T 2207/10016* (2013.01); *G06T 2207/10068* (2013.01); *G06T 2207/20148* (2013.01); *G06T 2207/30028* (2013.01)

(58) Field of Classification Search
CPC ............. G06K 9/00536; G06T 2207/10016; G06T 2207/10068; G06T 2207/20148; G06T 2207/30028; G06T 7/0012
USPC ............................................. 348/61, 65, 77
See application file for complete search history.

(56) References Cited

U.S. PATENT DOCUMENTS

| | | | | |
|---|---|---|---|---|
| 7,231,062 B2* | 6/2007 | Zhang | ............... | G06T 1/0042 382/100 |
| 8,022,979 B2* | 9/2011 | Miyamoto | ......... | A61B 1/00048 348/65 |
| 8,139,859 B2* | 3/2012 | Kruger | ............... | G01R 33/54 382/171 |
| 2006/0222249 A1* | 10/2006 | Hosaka | ............... | G06F 17/3025 382/235 |
| 2007/0188604 A1* | 8/2007 | Miyamoto | ......... | A61B 1/00048 348/65 |
| 2010/0080460 A1* | 4/2010 | Kruger | ............... | G01R 33/54 382/171 |

* cited by examiner

*Primary Examiner* — Mohamed Wasel
(74) *Attorney, Agent, or Firm* — Pearl Cohen Zedek Latzer Baratz LLP

(57) ABSTRACT

A method and system cascade analysis for intestinal contraction detection is provided by extracting from image frames captured in-vivo. The method and system also relate to the detection of turbid liquids in intestinal tracts, to automatic detection of video image frames taken in the gastrointestinal tract including a field of view obstructed by turbid media, and more particularly to extraction of image data obstructed by turbid media.

20 Claims, 12 Drawing Sheets

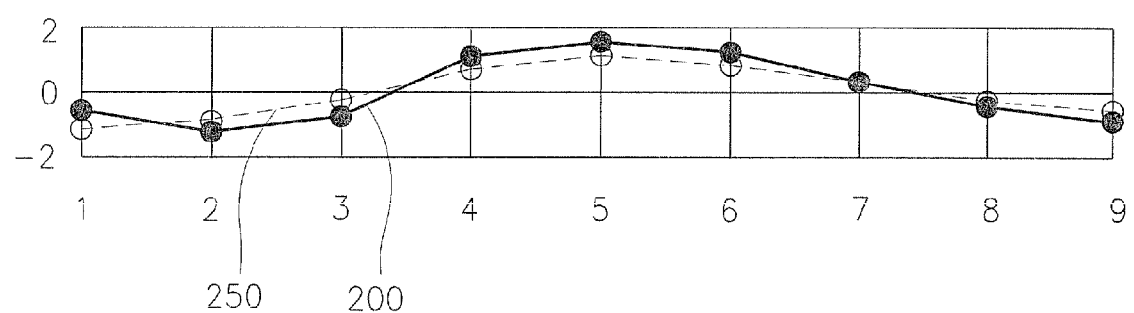
FIG.2

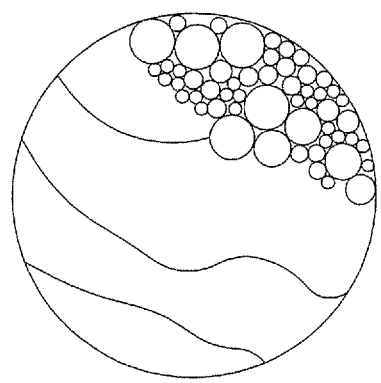 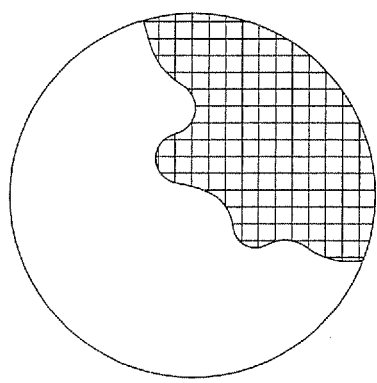
A    B
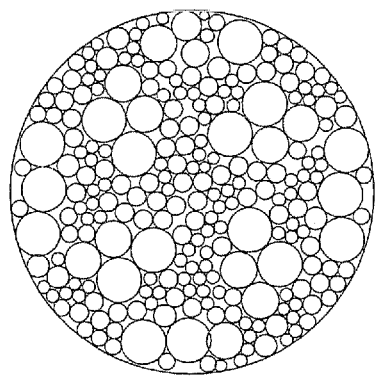 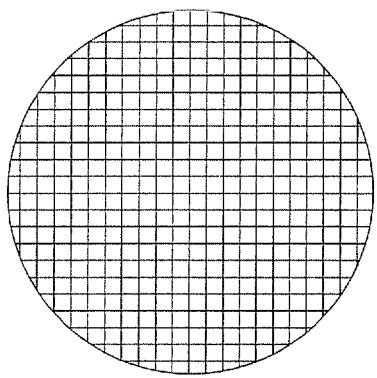
C    D
FIG. 7

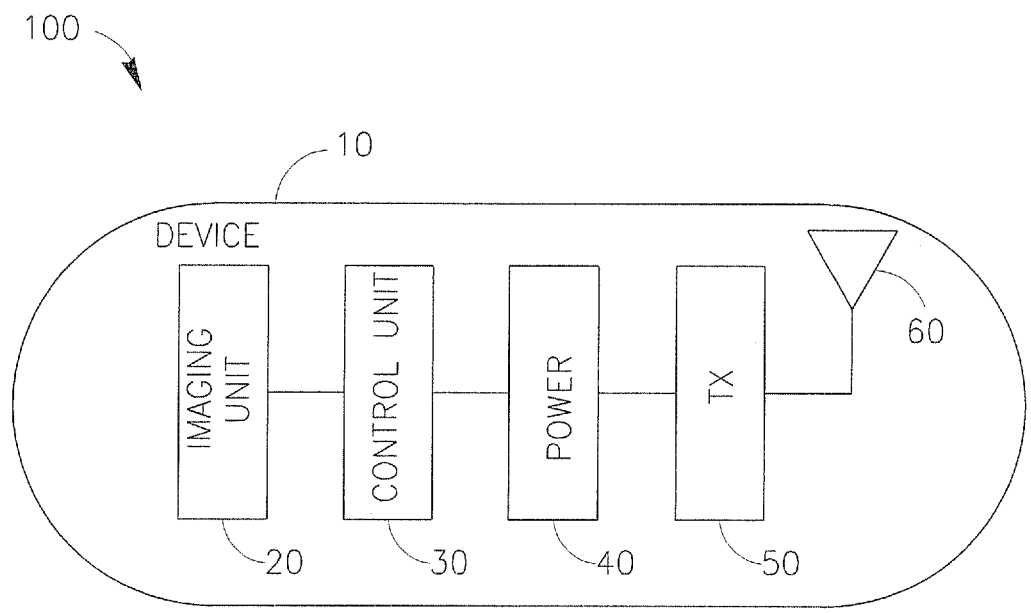
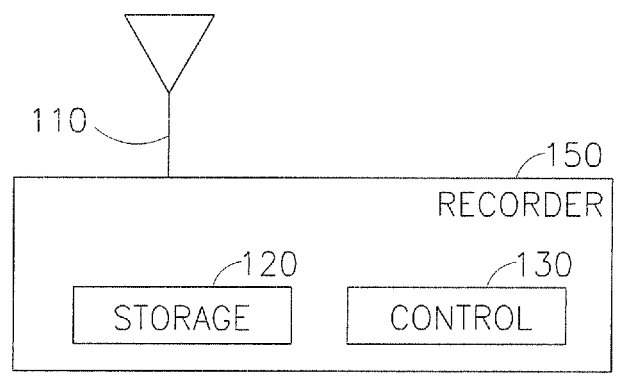
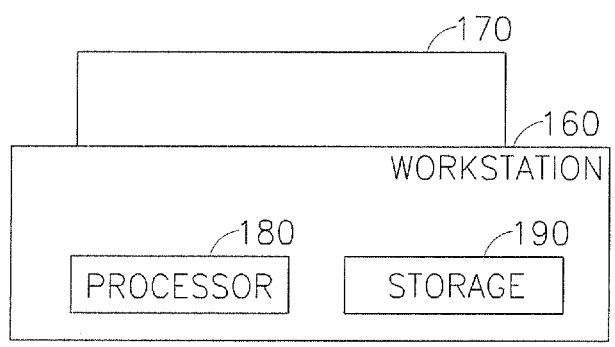
FIG.14

CASCADE ANALYSIS FOR INTESTINAL CONTRACTION DETECTION

CROSS-REFERENCE TO RELATED APPLICATIONS

This application is a continuation application of U.S. application Ser. No. 12/282,700, filed May 21, 2009 which is a National Phase Application of PCT International Application No. PCT/IL2007/000323, International Filing Date Mar. 13, 2007, which in turn claims benefit from U.S. Provisional Patent Application Nos. 60/781,372, filed Mar. 13, 2006, 60/798,335, filed May 8, 2006, 60/801,409, filed May 19, 2006, 60/812,631 filed Jun. 12, 2006, and 60/812,611, filed Jun. 12, 2006, all of which are incorporated herein by reference in their entirety.

FIELD OF THE INVENTION

The present invention relates in general to in-vivo imaging, and specifically to feature extraction from image frames captured in-vivo. The present invention also relates to the detection of turbid liquids in intestinal tracts, to automatic detection of video image frames taken in the gastrointestinal tract including a field of view obstructed by turbid media, and more particularly to extraction of image data obstructed by turbid media.

BACKGROUND OF THE INVENTION

Peristalsis within a gastro-intestinal (GI) tract may transport swallowed food and may aid in digestion and eventual evacuation. Peristalsis may result in pressure waves or contractions moving along the GI tract, thereby resulting in motility of a bolus or other object within the GI tract.

Certain pathological conditions may alter the normal motility within the GI tract. Low motility may be caused by, for example, an obstruction, a blockage, impaired motor activity, or other pathological condition. Motility disorders may be caused by, for example, nervous disorders, and may not necessarily be visible.

Abnormal intestinal motility may produce severe symptoms, such as chronic intestinal pseudo-obstruction. Known methods for diagnosis of intestinal motor disorders may be based on intestinal manometry, which may require prolonged intestinal intubations and/or intestinal histopathology on full thickness biopsies obtained by laparotomy or laparoscopy. Current evaluation of intestinal motility may relay on manometric detection of occlusive contractions, but these phasic events may account only for a minor fraction of recording time, and quiescence may be assumed by exclusion.

The analysis of intestinal dysfunctions generally requires invasive surgery in which a probe is introduced into the intestinal tract of a patient. The patient has to be hospitalized and the presence of qualified staff during the clinical intervention is required. Intestinal motility activity is one of the main sources of information which gastroenterologists have in order to assess the presence of certain intestinal dysfunctions. Motility assessment is generally performed by means invasive surgery, such as intestinal manometry.

Some in-vivo sensing systems may include an in-vivo imaging device able to acquire and transmit images of, for example, the GI tract while the in-vivo imaging device passes through the GI lumen.

Recently, a novel technique named capsule endoscopy has proved its efficiency as an alternative endoscopic technique. With capsule endoscopy, a pill with a micro-camera located inside it is swallowed by the patient. The capsule housing may incorporate an illumination source, power supply, and a radio-frequency transmitter to send, for example, a stream of image frames to an external device for storage and analysis. The capsule endoscope may be passively and/or naturally passed along the GI tract by for example peristaltic motion while capturing image frames from within the body lumen of, for example, the body lumen walls. As the pill traverses the gastrointestinal tract it takes pictures (images) thereof at a rate of a given number of frames per second.

The pictures are transmitted by means of radio communications to an external recording device where they are stored. The series of pictures taken as the pill traverses the gastrointestinal tract form frames of a video movie. The image frames captured may be, for example, downloaded into a workstation for review by specialists. In some examples, the image stream captured may be used for diagnostic purposes.

The use of capsule endoscopy analysis of the intestinal tract avoids the disadvantages of conventional invasive techniques. However, intestinal juices are often turbid with varying density, opacity and color and sometimes can be dense enough to block the whole field of view of the camera. In addition, intestinal juices may produce bubbles, which may differ in shape and color. Consequently, viewing of the video frames may be considerably hampered, if not impossible in some instances.

Turbid media, e.g. intestinal juices, may be present within the body lumen during image capturing. The turbid media may at times obstruct the field of view of the micro-camera so that some of the image frames captured may include an obstructed view of, for example, the body lumen wall.

Other devices, systems and methods for in-vivo sensing of passages or cavities within a body, and for sensing and gathering information (e.g., image information, pH information, temperature information, electrical impedance information, pressure information, etc.), are known in the art.

SUMMARY OF THE INVENTION

In general, several hours of video are taken by the pill as it traverses the gastrointestinal tract. In some embodiments it may be of no avail and also it may be a waste of time, to view "turbid frames". Accordingly, turbid frames may be separated out from clear frames with as little as possible intervention by a viewer of the video. This may be advantageous to decrease the viewing time by predisposing of the turbid frames, if one is not interested in turbid frames. Alternatively, if one is interested only in turbid frames then the clear frames may be predisposed of.

According to embodiments of the present invention, there is provided a system and method for detection of obstructed in vivo image data. According to one embodiment of the present invention detection of textural descriptors may be used to determine areas within an image frame that may be obstructed by turbid media, e.g. intestinal fluid including bubble formations and/or food content.

According to one embodiment of the present invention a bank of Gabor filters may be implemented to detect an obstructed area in an image stream. In one example the bank of Gabor filters may include filters applied in multiple orientations. In another example, the bank of Gabor filters may include filters applied with multiple scales.

According to another example of the present invention, image frames and/or a sequence of image frames showing an obstructed field of view may be extracted and/or suppressed from the displayed image stream.

In yet another example, sections of or detected areas within an image stream with an obstructed field of view may be masked during viewing of the image stream.

According to an embodiment of the present invention, there is provided a method for detecting turbid frames in a series of video frames of a given video taken by an in-vivo sensing device, the method comprising the initial steps of:

(1) constructing a self organized map representation of the video frames based on color information from each video.

(2) training a classifier with a small amount of labeled data.

(3) using the classifier to classify the unlabeled data.

(4) adding to the training set the most confident unlabeled points together with their predictive labels.

(5) re-training the classifier.

Following the initial training, a larger training set is constructed for final classification of the video frames.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2 shows a series of image frames together with a graph of corresponding intensity levels showing a dynamic pattern that may indicate contractile activity according to an embodiment of the present invention;

FIG. 7A to 7D is a schematic illustration of two exemplary image frames including an obstructed area and the corresponding detected obstructed area of each frame according to an embodiment of the present invention;

FIG. 14 is a schematic illustration of an in vivo imaging system according to an embodiment of the present invention.

Figure 1:
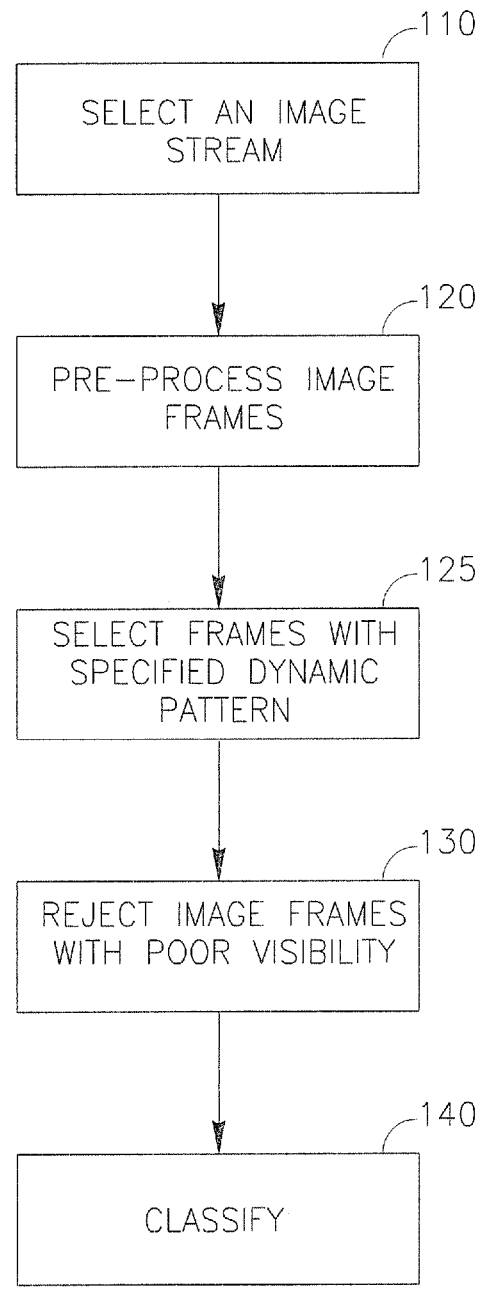
FIG. 1 shows an example method for rejecting image frames that may not include contractile activity of interest in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Small intestine motility dysfunctions may be shown to be related to certain gastrointestinal disorders which may be manifested in a varied symptomatology. The analysis of the intestinal contractions of the small bowel, in terms of number, frequency and distribution along the intestinal tract, may represent one of the methods with clinical pathological significance. Certain myopathic diseases have been associated with functional abnormalities of the intestinal muscle, which may lead to the presence of weak intestinal contractions and gastrointestinal dysfunctions. Other pathologies have been shown to be related to neuropathies which may affect the way the nervous system may control intestinal activity, for example, intestinal motility disorders that may lead to, for example, disorganized contractions and may hinder the movement of the nutrients along the intestinal tract. Small intestinal manometry may be widely accepted as a reliable technique for motility analysis so far. However, this approach is an invasive test which carries discomfort problems for the patient. In addition, its clinical value is limited to the examination of severe intestinal motor alterations, and it suffers a lack of sensitivity over certain types of intestinal contractions that may not be detected by means of this method.

According to embodiments of the present invention, an in-vivo imaging device, e.g. a Wireless Capsule Video Endoscope (WCVE) may be used as data source (Pillcam, Given Imaging, Yoqneam, Israel). WCVE consists of a capsule with a camera, a battery and light emitting diode (LED) lamps for illumination, which may be swallowed by a patient, emitting a radio frequency signal that may be received by an external device. This technique is much less invasive than conventional endoscopy, since the patient simply has to swallow the pill, which may be secreted in the normal cycle through the anus; moreover, hospitalization may not be required and the patient may engage in his/her daily routine, while a portable device worn by the patient may record the video movie emitted by the pill.

Although a portion of the discussion may relate to autonomous in-vivo imaging devices, systems, and methods, the present invention is not limited in this regard, and embodiments of the present invention may be used in conjunction with various other imaging devices, systems, and methods. For example, some embodiments of the invention may be used, for example, in conjunction with an endoscope, or other devices used for imaging body lumens for example to detect a medical condition or pathology using image analysis.

The device, system and method of the present invention may be utilized in conjunction with other suitable imaging or sensing devices, systems and methods. Some embodiments of the present invention are directed to an autonomous in-vivo sensing device, e.g., a typically swallowable in-vivo imaging device. Devices, systems, and methods of the present invention may be used with an imaging system such as that described in U.S. patent application Ser. No. 09/800,470, entitled "Device and System for In Vivo Imaging", filed on Mar. 8, 2001. A further example of an imaging system, with which or in which devices, systems and methods of the present invention may be used, is described in U.S. Pat. No. 5,604,531 to Iddan et al., entitled "In-Vivo Video Camera System", filed on Jan. 17, 1995 and/or U.S. Pat. No. 7,009,634, entitled "Device for In-Vivo Imaging", issued on Mar. 7, 2006. Both these publications are assigned to the common assignee of the present application and are incorporated herein by reference in their entirety.

Furthermore, a receiving and/or display system suitable for use with embodiments of the present invention may also be similar to embodiments described in US Patent Application Publication Number US20010035902 and/or in U.S. Pat. No. 5,604,531. Devices and systems as described herein may have other configurations and other sets of components. Alternate embodiments of a device, system and method may be used with other devices, for example, non-imaging and/or non-in-vivo devices. For example, some embodiments of the present invention may be practiced using an endoscope, a probe, a needle, a stent, a catheter, etc.

Some embodiments of the present invention may be or may include an autonomous swallowable capsule, but may have other shapes and need not be swallowable or autonomous. Embodiments are typically self-contained, but need not be. For example, a device according to some embodiments may be a capsule or other unit where all the components are substantially contained within a container or shell, and where the device does not require any wires or cables to, for example, receive power or transmit information.

According to embodiments of the present invention an in-vivo imaging device, e.g. a capsule endoscope, may pass through the GI tract by natural peristaltic motion while imaging the body lumen through which it may be passing. An image stream captured by an in-vivo imaging device may include images of contractile activity of the body lumen walls.

Gastrointestinal (GI) contraction patterns, e.g. small intestine (SI) contractions patterns, may be among the motility patterns which may bear clinical pathological significance for gastrointestinal disorders, e.g. ileus, bacterial overgrowth, functional dyspepsia, irritable bowel syndrome, and/or other conditions. GI contractions may be classified in a number of ways to aid for example, in diagnosis, e.g. may be classified on the basis of their duration. Visual annotation of contractions, contractile events, and/or motility events from an image stream captured by an in-vivo imaging device may be for some applications laborious, as the in-vivo imaging device may capture an image stream that may include a large number of image frames, e.g. 50,000 image frames, as it may pass through the GI tract. An image stream may include other number of frames.

According to some embodiments of the present invention, image frames and/or image sequences captured during contractile activity may be automatically detected. For example, image processing, pattern recognition and/or feature extraction may be used to trace image frames and/or image sequences including contractions, e.g. wrinkle contractions. Image frames including contractile activity may be identified and used for example for diagnosis of pathology and/or disorders, for example based on, number, frequency and distribution of contractions along the intestinal tract, duration and/or geometrical pattern. Other aspects of contractile activity may be inspected. Image frames from an image stream captured in vivo including contractile activity may be displayed as a separate video, as a sequence of image frames, and tagged in the original image frame or otherwise visually indicated. For example, markers along a time bar or tissue color bar may indicate where along an image stream, image frames including contractile activity may have been identified. Other methods of identifying image frames including contractile activity may be used.

According to embodiments of the present invention an in-vivo imaging system may include a machine learning system which may automatically learn and classify contractions from a capsule video source and/or other in-vivo imaging sources, providing a reviewer, such as a health profession, a subset of the video sequences and/or series which may show intestinal contractile activity. This may yield a considerable reduction in visualization time of the data recorded. According to one embodiment of the present invention, the machine learning system may dynamically adapt itself to the different patterns of intestinal and/or body lumen activity associated with intestinal and/or body lumen contractions and/or motility events.

Reference is now made to FIG. 1 showing a method for rejecting image frames that may not be of interest, e.g. image frames that do not show information regarding contractile activity. According to embodiments of the present invention, the method for rejecting image frames may be sequentially modular, e.g. a cascade. For example, each part of a cascade system to identify contractile activity within a video and/or image stream may receive as an input the output of a previous stage. Other methods for rejecting image frames that may not include contractile activity, contractile events and/or motility events may be used. In block 110 an image stream for analysis may be selected, e.g. as input to a contraction detector. In block 120 pre-processing may be performed on the image stream and/or on image frames included in the image stream. In block 125 image frames and/or a series of image frames that may follow a specified dynamic pattern may be selected, for example image frames that follow a specified motion patterns that may be typical during contractile activity may be selected. In block 130, image frames with poor visibility, e.g. image frames including turbid content or displacement of the camera, may be rejected, for example by a turbid detector. In block 140 classification, for example classification based on a Support Vector Machine (SVM) may be performed. Output from the classification may provide image frames that may with high probability include contractions. In one example each one of the blocks 110, 120, 125, 130, and 140 may be implemented in the cascade system and may serve as input to a subsequent block. Other suitable steps and methods may be included.

According to embodiments of the present invention, learning steps may be included for each stage of the cascade by defining parameters for tuning the classification performance. In one example, the block 130 for rejecting image frames with poor visibility and block 140 for classification may consist of, for example, two SVM classifiers trained with a data set that may have been labelled from previous studies. In other examples, SVM classifiers may be based on user input information. Other numbers of SVM classifiers may be used.

According to embodiments of the present invention a cascade method described herein may provide a cost-sensitive method for identifying image frames including, for example, a contractile event and may reduce the imbalance ration of the data. In examples of the present invention, the cascade system may reject in each step and/or block, e.g. block 120, 125, 130, and 140 an amount of frames which may, for example, predominantly include images which may not be intestinal contractions—i.e., cascade system negatives—, letting pass through the sequential stages, for example, those frames that may be related to intestinal contractions i.e., the cascade system positives. This may yield an effective reduction of the imbalance ratio of the data set at the input of the classification stage in bock 140.

According to one embodiment of the present invention, the length of the image frame sequence depicting contractile activity may be predefined. For example, an image sequence corresponding to 4-5 seconds, e.g. 9 frames captured at 2 frames per second, may be defined as the length of the image sequence showing a contractile event. In one example the selection of image frames may be performed in blocks of predefined image sequence lengths, e.g. 9 image frames per sequence selected. For example, the cascade may pass through in its various stages, selected image sequences of predefined lengths. Other methods may be used.

According to embodiments of the present invention, each stage in the cascade system may be tuned to prune as many non-contraction frames as possible, for example, while minimizing the loss of true positives so as to reduce the imbalance ratio of the data. In some examples, pruning methods used in the first stages of the cascade system may require less computation time per frame as compared to pruning methods used in later stages of the cascade system. For example, the computation time required per frame for pruning may increase while advancing through the cascade system and the number of image frames on which computation is performed may decrease while advancing through the cascade system.

According to one embodiment of the present invention, the classification block 140 that may consist of the SVM classifier trained by means of under-sampling, may face a classification problem with an imbalance ratio of about 1:5 in contrast with an initial imbalance ration of 1:50 at the input of the cascade system in block 110.

According to another embodiment of the present invention, the modular shape of the cascade system may allow new targets in the video analysis procedure to be defined, for example, that may be included as new filter stages. In one example, the new targets may add domain knowledge to the cascade system in a natural and flexible manner.

Reference is now made to FIG. 2 showing a specified dynamic pattern that may indicate contractile activity according to an embodiment of the present invention. FIG. 2 shows a sample schematic sequence of 9 consecutive image frames (from left to right) that may have been captured at a rate of 2 frames per second that depict a contractile event, e.g. a phasic contractile event. Phasic contractions may be described as contractions that may begin with an open lumen, e.g. an open intestinal lumen that may be followed by a relatively sudden closing of the lumen, followed by a posterior opening of the lumen. This open-close-open scheme may typically span over a duration of, for example, 4 to 5 seconds. In one example, the closing of the lumen may be occlusive, e.g. complete with no lumen showing in the image frame. In another example the closing of lumen may be non-occlusive, e.g. incomplete such that a small portion of the lumen may be visible during the peak of the contraction, e.g. the closed state. FIG. 2 may be an example of a non-occlusive phasic contraction showing a dynamic pattern such as an open-close-open scheme over 9 image frames. The corresponding intensity graph may depict this pattern quantitatively and/or numerically.

The vertical axis of the graph 200 shown in FIG. 2 may be an intensity level, e.g. a global intensity level of the image frame or a portion of the image frame, normalized intensity level, etc. The horizontal image frame may be a frame number of a series and/or sequence of image frames captured, for example, consecutively. Alternately, the horizontal axis may indicate time.

According to one embodiment of the present invention, when capturing image frames from within a body lumen, light may be reflected off the lumen walls and dissipated in the lumen area. As the lumen closes, less light may be dissipated through the lumen and more light may be reflected off the lumen walls. As such the intensity level may increase as the lumen closes. Subsequently, as the lumen reopens, a portion, e.g. a larger portion of the illumination may again be dissipated through the lumen and less light may be reflected off the lumen wall. As the lumen opens again, the intensity level may decrease.

Image frames sequences that may follow this pattern may be depicted as sequences that show contractile activity and such sequences may be selected to advance to the next stage of the cascade. In one example, the intensity pattern may be compared to a reference intensity pattern 250 for contractile activity. The reference intensity pattern may be obtained by for example averaging a number of intensity patterns of images frames showing contractile activity. Other methods may be used. A high correlation between a reference intensity pattern and a current intensity pattern a may indicate contractile activity. Other contraction patterns may be detected.

According to an embodiment of the present invention, detection of dynamic pattern of a series of image frames may be a first step and/or a pre-filter stage for extracting image frames showing contractile activity from an image stream captured while travelling through a body lumen. For example, image frames that do not follow the specified dynamic pattern, may be rejected and may not enter the next stage of the cascade system. Other methods may be used and/or the detection by dynamic pattern may be implemented at an alternate stage.

According to embodiments of the present invention, a system and method for the automatic detection of video endoscopy sequences, image frames, and/or areas within an image frame whose field of view may be obstructed by turbid media, e.g. intestinal juices and/or food may be described. These sequences, e.g. image frame sequences, and/or image frames may for example be characterized by the presence of a turbid liquid accompanied by for example bubbles and other artifacts related to the flux of the different secretions into the GI tract. In one example, sequences, image frames or areas within an image frame that may hinder the desired visualization of the body lumen walls may be labeled, e.g. labeled as non-valid for analysis, and/or otherwise removed from the image stream, e.g. video. Removal of sequences that may in some application be considered invalid, for example in diagnosis, may serve to reduce the overall viewing time required by the specialist to review the capture image stream, for example, to make a required diagnosis. In some examples, viewing time may be reduced with no relevant loss of valid frames. In some examples, the present invention may be applied to other image analysis scenarios where a similar pattern of bubbles described herein may be found.

According to embodiments of the present invention, an in-vivo device, e.g. a capsule endoscope, may capture a stream of image frames of a body lumen wall while passing through and/or being situated within a body lumen. Turbid media, for example, intestinal juices, bubbles, and/or content may be present within the body lumen during image capturing. In some examples, one or more image frames captured by the in-vivo device may include a partially obstructed view due to the turbid media that may be present within the body lumen. In one example 20 to 30 percent of the image stream may be deemed invalid for diagnosis due to obstruction of the field of view. Other percentages of the image stream may be obstructed by turbid media or due to other factors. Removal of this portion of the image stream may significantly reduce the time required for a specialist to review the image stream and make a diagnosis. For example, the turbid media may obstruct a view of a body lumen wall being captured. In some examples, image frames or section of image frames including an obstructed view may not be useful for diagnostic purposes. Removing image frames that may have a fully obstructed view or removing sections of image frames that may have a partially obstructed view may reduce the viewing time that may be required for diagnosis.

In video capsule endoscopy, the good visibility of the intestinal lumen and wall may be hindered at times by the presence of intestinal juices mixed up with the remains of food. These intestinal secretions may be visualized in an image frame as a semi-opaque turbid liquid accompanied by the presence of bubbles and other artifacts related to the flux of the different fluids into the gut. As a result, this turbid liquid is interposed between the camera and the body lumen wall, obstructing its desired visualization. The turbid liquid may take on a wide range of colors, for example, from brown to yellow. One relevant trait of the turbid liquid may be the presence of a texture pattern consisting of little bubbles of different sizes and quasi-circular shape.

Figure 3:
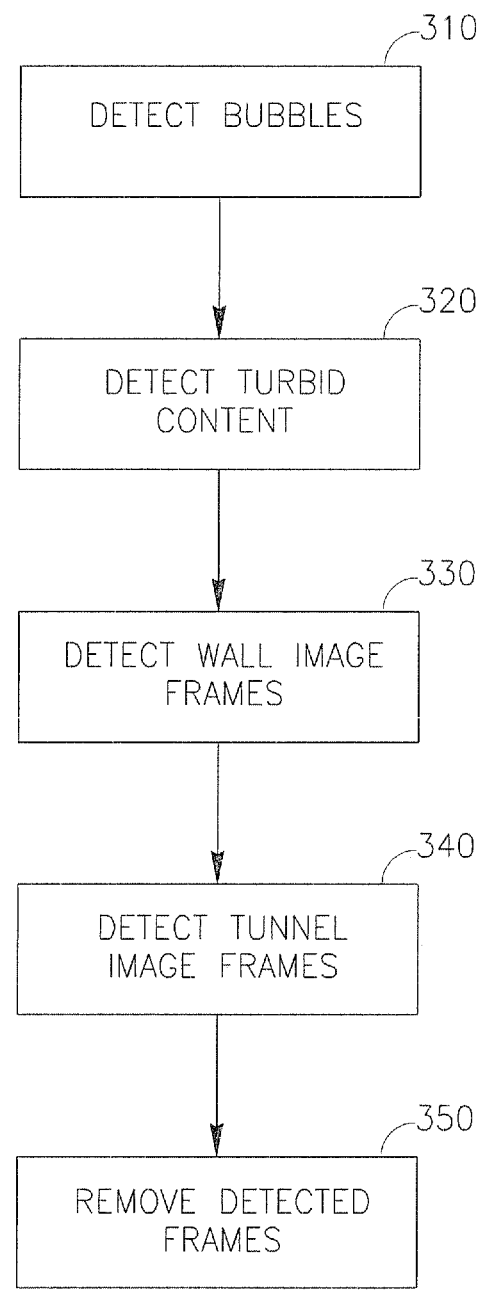
FIG. 3 shows a method for detecting image frames with poor visibility according to an embodiment of the present invention.

Reference is now made to FIG. 3 showing a method for detecting image frames with poor visibility according to an embodiment of the present invention. According to an embodiment of the present invention, a following stage, e.g. stage 2 of the cascade system may reject frames that have poor visibility and/or may reject frames that may not be valid for analysis of contractile activity. Such frames may include, turbid frames, e.g. frames blemished or stained with turbid liquid and/or content and/or bubbles, wall frames, i.e. frames where the in-vivo imaging device is focused on the lumen wall and may not be aligned with the lumen, and tunnel frames, i.e. frames where the lumen may appear static for a relatively long sequence of time.

In block 310, frames including bubbles may be detected. Frames including bubbles may be typical in image streams captured while a patient may be fasting. Such frames may provide physiological variables related to intestinal motility.

In other embodiments of the present invention, pathology may be detected by analysis of the turbid frames and/or the number of turbid frames within an image stream of the GI tract. For example, patients with intestinal motor dysfunction may show a relatively large number of turbid frames in an image stream of their GI tract, e.g. a number above a defined threshold, as compared to healthy subjects. In one example intestinal motor dysfunction may be detected and/or screened for based on analysis of the turbid image frames, e.g. bubble frames or other turbid frames.

Bubble detection may be implemented for example, by texture characterization, e.g. texture characterization using Gabor filters. Other known texture descriptors may be implemented to detect bubble formation in captured image frames. For example, Laplacian of Gaussian, wavelet analysis, and the use of derivatives of Gaussians and Gabor banks of filters that may be suitable for multi-scale and directional characterization applications may be used to detect texture in an image frame such as for example bubble formation of different sizes and/or food or content within the intestines. Other methods of bubble detection may be implemented. Visibility in the image frames may be partially or completely masked due to bubbles. In one example, image frames that may be masked over a define percentage due to the presence of bubbles may be removed or discarded, e.g. may not enter into the follow stage of the cascade system. For example, image frames that may be masked by bubbles in over 50% of the image frame area may be discarded and/or may not pass on to the subsequent stage of the cascade. Other criteria may be used.

In block 320 turbid content besides bubble formation, e.g. hazy turbid liquid may be detected, for example by color characterization and/or SVM classifiers. Color characterization may include known color histogram matching techniques to detect turbid image frames. For SVM classifiers different features may be implemented, for example Red, Green, Blue (RGB) quantization, e.g. color quantization into a reduced space, RGB mean, e.g. the average value of RGB components, LAB quantization, e.g. quantization similar to RBG quantization using LAB color (luminance, color A, color B) opponent codification, AB mean, e.g. the average value of the AB component of the LAB vector. Other features may be used. The two main generalized parameters to be set for an SVM classifier may be a kernel type and a kernel parameter. Typical kernels may include linear kernels, polynomial kernels, and radial basis function kernels. The SVM may classify the image stream frames into turbid and non-turbid.

The turbid detector to be described below uses semi-supervised training based on the color information of a video for a given person. The reason for this being that each person may have a different color that may represent turbid liquid and it may be difficult to define a turbid color in the gastrointestinal tract for all people. Instead of having a global training set for all videos taken of gastrointestinal tracts of different people, with the semi-supervised approach, the detector is trained on the "color peculiarities" of a video taken of gastrointestinal tract for a particular person.

The semi-supervised method used is a self-training method. In self training, a classifier is first trained with a small amount of labeled data. The classifier is then used to classify the unlabeled data. The most confident unlabeled points together with their predictive labels are added to the training set. The classifier is re-trained and the procedure is repeated. Consequently, the classifier starts from a small approximate training set and uses its own prediction to teach itself.

The classifier is initialized using the color Self Organized Map (SOM) representation of a video. The initialization is performed using the SOM and by clicking on its cells. The SOM is constructed using color information from each video frame. More specifically the SOM is constructed using two features per frame, which are the mean value of the chromaticity components using the Lab color space (see FIG. 1, in which the colors have been converted to a grey scale).

Figure 10:
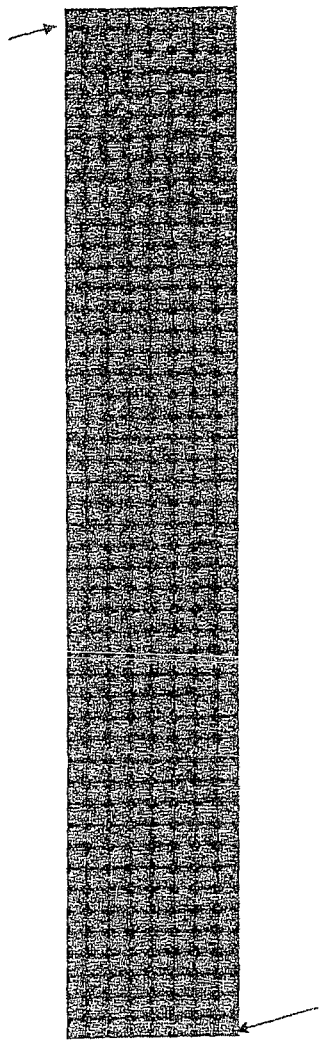
FIG. 10 is a Self Organized map constructed using the mean value of chromaticity components in the Lab space.
Figure 11:
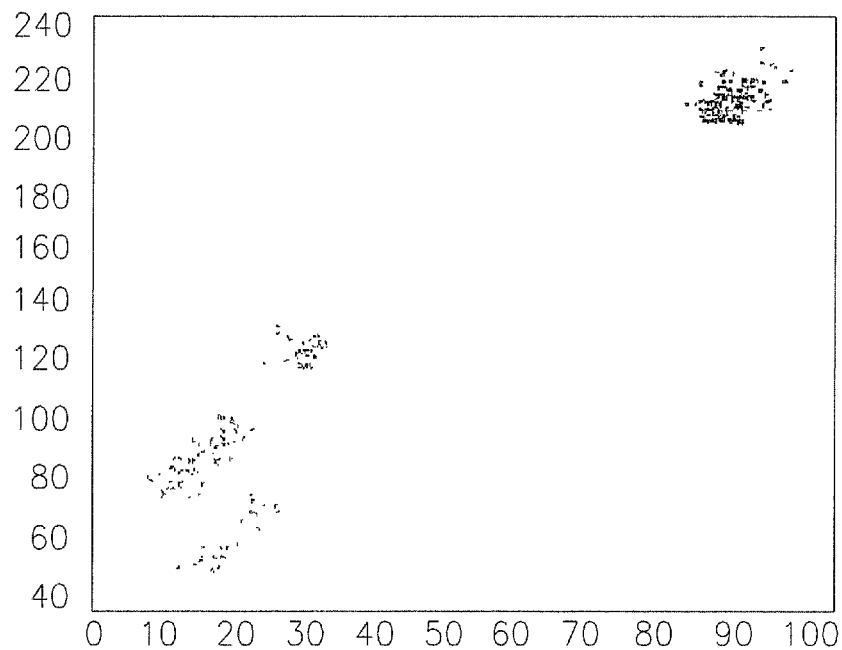
FIG. 11 is a scattergram of the initialized training set.
Figure 12:
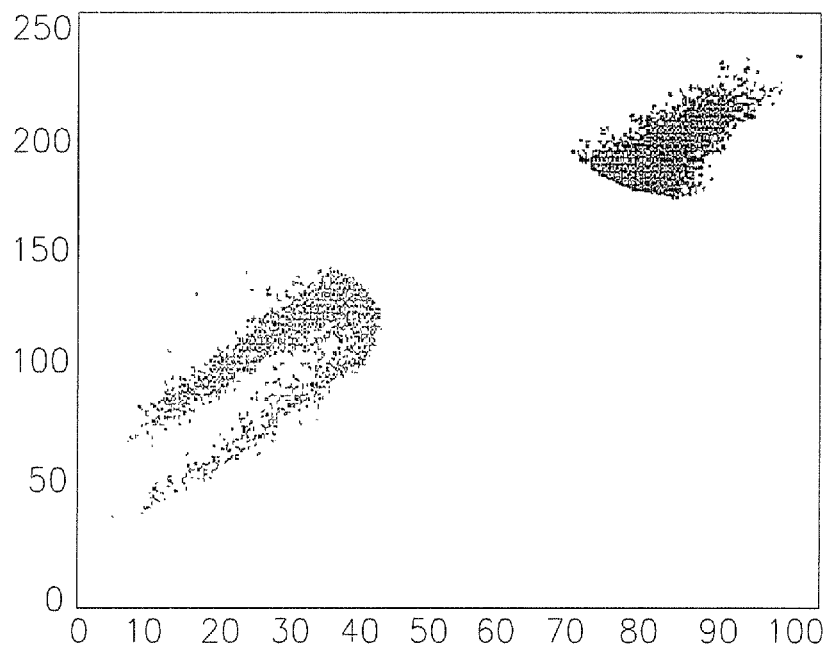
FIG. 12 is a scattergram of updated training samples for each category.

A health professional views the SOM and initializes the classifier, by selecting representative examples of each class (see the arrows in FIG. 10). In the first iteration, a Support Vector Machine (SVM) classifier labels the video frames as valid or not valid for analysis using the initial training set defined by the expert (FIG. 11). In FIG. 11, the black color (top right hand corner) represents the "clear frames" and grey color represents the "turbid frames". In accordance with some embodiments, the "clear frames" are valid for analysis and the "turbid frames" are not valid for analysis. The horizontal axis is the mean "rg-chromaticity" component and the vertical axis is the mean "by-chromaticity" component of the Lab space. From the first iteration, the "safe" labels are selected and used to construct a larger training set (FIG. 12).

Figure 13:
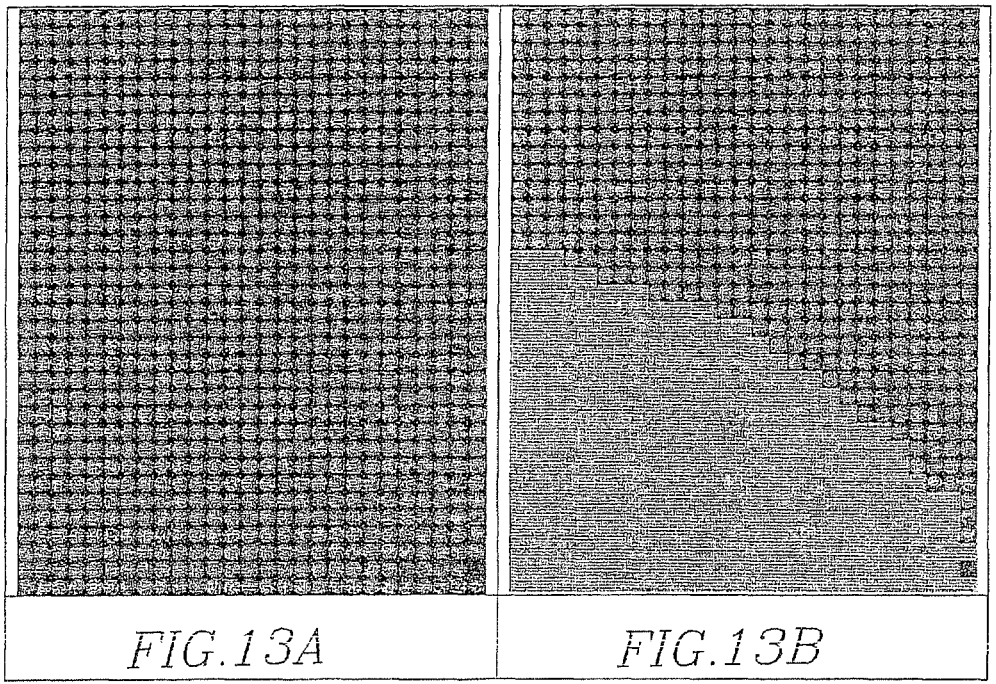
FIG. 13a is a grey scale representation of video using an SOM map.
FIG. 13b is a grey scale representation of video using an SOM map showing the results of the final labeling (uniform grey cells).

Using the enhanced training set (FIG. 12), the SVM classifier is re-run and the final frame classification is carried-out. The results of the final labelling (uniform grey cells in bottom left hand corner of FIG. 13) can be viewed using the SOM map.

The advantages of the method are as follows: (1) It is accurate: the detector each time is trained on the intrinsic "color peculiarities" of each video. (2) It is fast: Only two color features are used for constructing the SOM map and self-training the SVM classifier. (3) It is reproducible: Consistent SOM color representation safeguards for reproducibility. In other words, by only clicking a few (3 or 4) SOM cells, the classifier is adequately initialized. The only requirement is for the user (expert) to have a clear idea of the classification task that has to be performed, which may be, for example, but not limited to:

Non valid for analysis frames (turbid/bubbles and dark frames) against the clear frames Turbid/bubbles against all the rest (clear frames and dark frames)

Dark frames against the rest (turbid/bubbles and clear frames)

Presence of blood.

Reference is now made to FIGS. 7A to 7D showing schematic illustrations of two exemplary image frames including an obstructed area and the corresponding detected obstructed area of each frame according to an embodiment of the present invention. In some examples, image frames of the body lumen wall captured in vivo, for example image frames captured with an in vivo device, may be partially and/or completely obstructed by bubble formation formed for example by intestinal juices. The bubble formation as well as other turbid content may at times obstruct a desired field of view of, for example, the intestinal walls. In other examples only a portion of the image frame may be obstructed by turbid liquid. In yet other examples, no obstruction to the desired field of view may be present.

Reference is now made to FIGS. 7B and 7D showing areas corresponding to the obstructed areas shown in FIGS. 7A and 7C respectively. According to embodiments of the present invention, automatic detection of sections of image frames and/or entire image frame with an obstructed view may be preformed. Detection of image frames with obstructed views may allow automatic removal of those image frames from the image stream. This may help shorten the required viewing time of the capture image stream. In other examples, removal of image frames with obstructed view may also facilitate more efficient automatic detection of other features that may be identified in the image stream, for example polyps, bleeding, other pathologies, or other conditions. Detection of images including obstructed view may be implemented for other suitable purposes.

Figure 8:
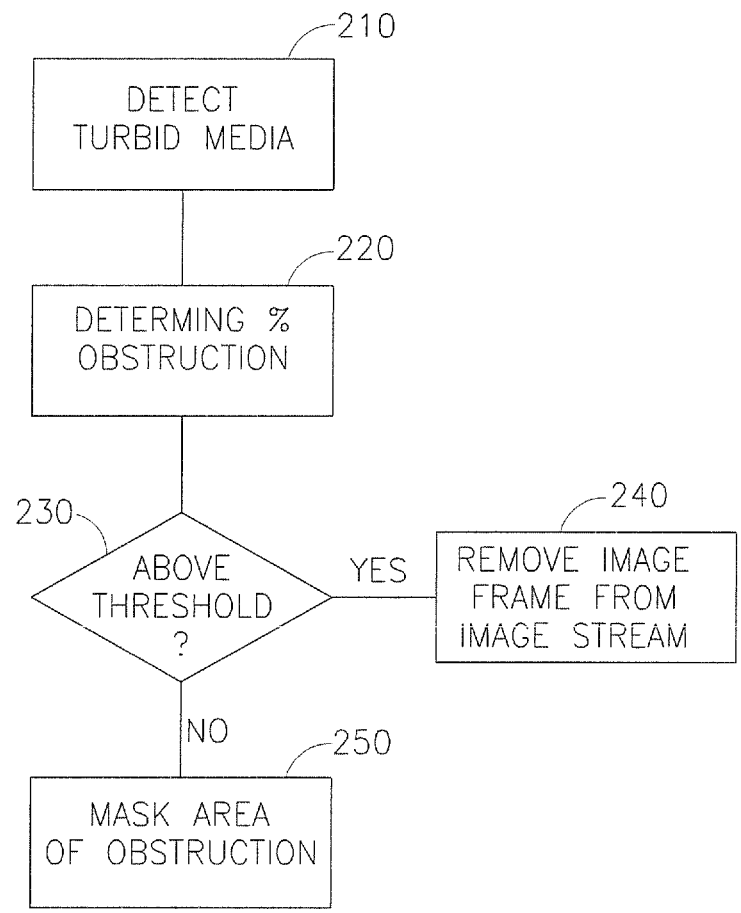
FIG. 8 is a flow chart describing a method to extract portions of an image stream including obstructed fields of view according to an embodiment of the present invention.

Reference is now made to FIG. 8 showing a flow chart describing a method to extract portions of an image stream including obstructed fields of view according to an embodiment of the present invention. In block 210 an area within an image frame obstructed, for example by a turbid media, may be detected. Automatic detection of areas obstructing a desired field of view may be detected by methods described herein or by methods known in the art. In block 220, the percent of obstruction in the image frame may be determined. For example it may be determined that the entire image frame may be obstructed, e.g. 100% obstruction. In other examples, only a portion of the image frame may show an obstructed view, e.g. 20%. 50%, or other percentage. In block 230 a decision is made as to whether the image frame should be removed from the image stream. For example, if the area of the obstructed view is above a determined threshold, for example, in the range of 50-80%, e.g. 50% or other suitable percentage, the image may be removed from the image stream (block 240). In one example, the threshold may be specific for the application, for example, a higher threshold may be used for specific diagnostic purposes, other considerations may influence the threshold. In other examples, the image frame may not be removed permanently but may be tagged or marked so that it may not be included when viewing the image stream in some cases or when performing automatic detection of features in the image stream, e.g. to determine pathology or to perform other automatic screening. In block 250 image frames showing obstructed areas below the determined threshold may be maintained. In some examples, areas that were marked as obstructed may be masked, for example by darkening or whitening or masking in another way the area that is obstructed. This may deemphasize that area where it may have been determined that no information may be obtained.

According to embodiments of the present invention, image detection of obstructed areas, e.g. bubbles, in an image frame may be detected based on texture descriptors, characterization or detection. In some examples and typically, the size of the bubbles may widely vary inter- and intra-frame. Suitable methods known in the art for texture descriptors may be implemented to detect obstructed areas in captured image frames. For example, Laplacian of Gaussian, wavelet analysis, and the use of derivatives of Gaussians and Gabor banks of filters that may be suitable for multi-scale and directional characterization applications may be used to detect texture in an image frame such as for example bubble formation of different sizes and/or food or content within the intestines.

According to one embodiment of the present invention Gabor filters may be used to detect obstruction due to bubble formation and/or other content present within a body lumen. Automatic suppression of all non-valid sequences from the video may reduce the visualization time that may be required. Gabor filter may be viewed as a sinusoidal plane of, for example, a particular frequency and orientation, modulated by a Gaussian envelope. These filters may possess good localization properties in both spatial and frequency domain and may be applied, for example in texture segmentation, edge detection, target detection, document analysis, retina identification, image coding, and image representation, among others implementations. Gabor filters may be applied in different orientations and in different scales, for example to construct a bank of filters as may be known in the art. According to one embodiment of the present invention, the Gabor filter may be applied in for example multiple orientations and/or directions, e.g. at 0°, 45°, 90° and 135°, and multiple scales, e.g. 1, 2, 4 and 8. Other number of orientations and/or scales may be used. In one example, the number of filters used, e.g. in different orientations and scales may be determined based on the criteria defined for the percent of false positives. Other considerations may be taken in account when determining the number of filters to be used.

According to an embodiment of the present invention, all the single filter responses may be gathered to obtain a global response of the bank of filters. A global and/or overall In image may be defined as:

$$I_n = \sum_{i=1}^{4} \sum_{j=1}^{4} \mathrm{abs}\{I_n^{i,j}\}$$

where $I_n^{i,j}$ represents the resulting response image of applying the filter with orientation i and scale j over the frame n in an image stream.

According to some embodiments of the present invention, the texture descriptor and/or segmentater, e.g. the bank of Gabor filters, may distinguish between folded tissue of, for example, the body lumen wall and food pieces, bubbles from for example, intestinal juices.

In one example, the response images may be cropped, e.g. cropped by 7%, using a circular mask to eliminate a high response of the filter at the boundary of the field of view. Other methods of cropping may be used. In some examples, cropping may not be used and/or required.

Figure 9:
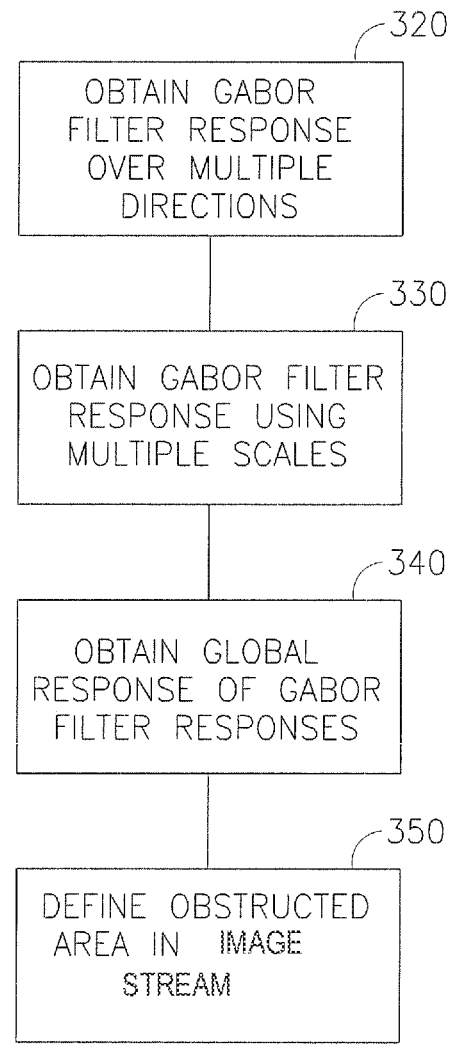
FIG. 9 is a flow chart describing a method for detecting image data obstructed by turbid media using a bank of Gabor filters according to an embodiment of the present invention.

Reference is now made to FIG. 9 showing a flow chart describing a method for detecting an obstructed area in an image stream using Gabor filters according to an embodiment of the present invention. In block 320 Gabor filters may be applied over an image frame in multiple directions, e.g. 4 directions. Other number of directions may be used. In one example, the directions may include at 0°, 45°, 90° and 135°. Other directions may be implemented. In block 330 Gabor filters may be applied using multiple scales, e.g. 4 scales. Other number of scales may be used. In one example, the scales 1, 2, 4 and 8 may be used. Other suitable scales may be used. In other examples, other filters or groups of filters may be used together and/or in addition to the Gabor filters to detect specific textures in an image frame that may indicate an obstruction. In block 340 an overall and/or global response of the bank of filters may be obtained. FIG. 3 describes a specific example of detection of obstructed image data using a bank of Gabor filters. In other embodiments of the present invention, other texture descriptors may be used to detect obstructed image data and/or specifically bubbles image in an image frame, a sequence of image frames and/or an image stream. For example, a bank of texture descriptors may be used. In block 350 the area in the image frame containing an obstructed view may be tagged, marked, and/or masked.

According to embodiments of the present invention, removing image frames from an image stream of an in vivo body lumen including a defined percentage of obstruction may reduce visualization time. In some examples, an image stream captured in a GI tract may be reduced by 20% by removing image frames with obstructed views. In other examples, masking, e.g. darkening pixels corresponding to non valid frames may allow a specialist to direct its visualization analysis specifically to the region of valid frames, avoiding the analysis of video sequences with no information due to the presence of occluding intestinal juices. In addition to this, a clear representation of the intestinal juices distribution in video may be provided and may be used for further clinical analysis.

Figure 4A:
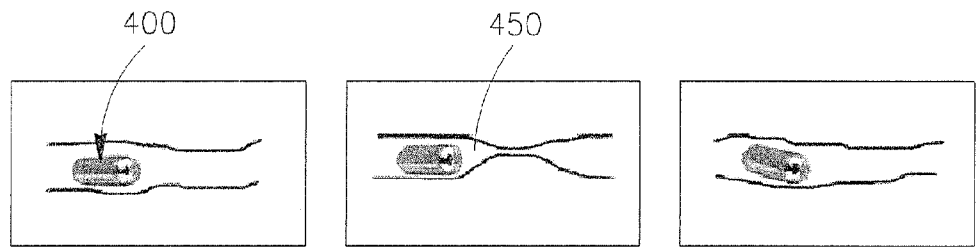
FIG. 4A shows a graphical representation of an in-vivo imaging device within a body lumen before, during and after a phasic contractile event according to an embodiment of the present invention.
Figure 4B:
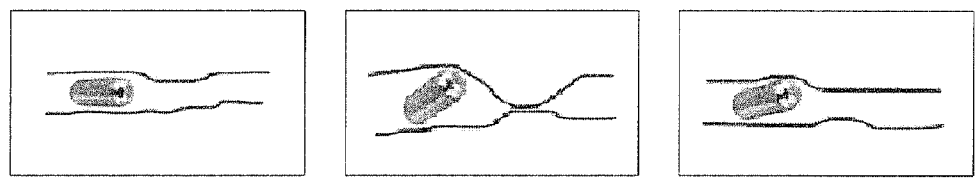
FIG. 4B shows a graphical representation of an in-vivo imaging device within a body lumen pointing toward a lumen wall before, during and after a contraction according to an embodiment of the present invention.
Figure 4C:
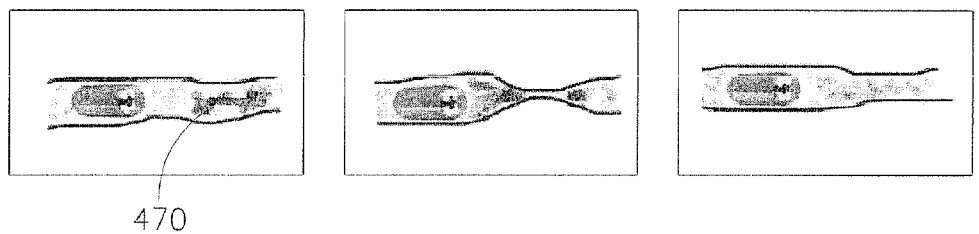
FIG. 4C shows a graphical representation of an in-vivo imaging device within a turbid body lumen before, during and after a contraction according to an embodiment of the present invention.

Reference is now made to FIG. 4A-C showing scenarios of an in-vivo imaging device travelling through a body lumen before, during, and after a contraction. In some embodiments of the present invention, the position of the in-vivo imaging device in the lumen during contractile activity may not be steady. Since the in-vivo imaging device may move freely through the lumen, multiple changes in direction and orientation may occur. As a result the camera may not always focus on the central part of the lumen. Shown in FIG. 4A may be a paradigm of a phasic contraction where the in-vivo imaging device 400 may pass through a lumen 450 such that the in-vivo imaging device 400 may be aligned with the lumen 450. Shown in FIG. 4B is an in-vivo imaging device that may point toward the lumen wall such that the image frames captured during contractile activity may include the lumen wall and may exclude a view of the lumen. Shown in FIG. 4C may be an example of the presence of turbid liquid that may hinder the visualization of the contractile activity.

According to one embodiment of the present invention, an image frame sequence identified in the dynamic pattern stage of the cascade may be rejected if more than a given number of frames in the series may be identified as turbid frames and/or frames with poor visibility. In one example if more than 4 consecutive frames in a sequence and/or 50% of the frames in a sequence may be turbid, the image series identified in the dynamic pattern stage of the cascade may be removed.

According to one example, wall and tunnel frames may be characterized by image frames that do not carry motility information. Wall frames may be image frames captured while the in-vivo imaging device may have been facing the intestinal wall (FIG. 4B), such that the lumen may have been out of the field of view. Tunnel image frames may occur when the in-vivo imaging device may be oriented toward the lumen for a span of time where no contractile activity may be present. Characterization of both wall and tunnel frames may be implemented by detection and/or determination of the area of the lumen in the image frame. In examples of the present invention, the lumen may appear as a dark hole and/or a blob surrounded by the lumen walls in the image frame. In one example a Laplacian of Gaussian filter (LoG) may be applied. In one example, the output of the LoG Filter may be high when a dark spot is found. Other filters may be used to detect the lumen area.

Figure 5:
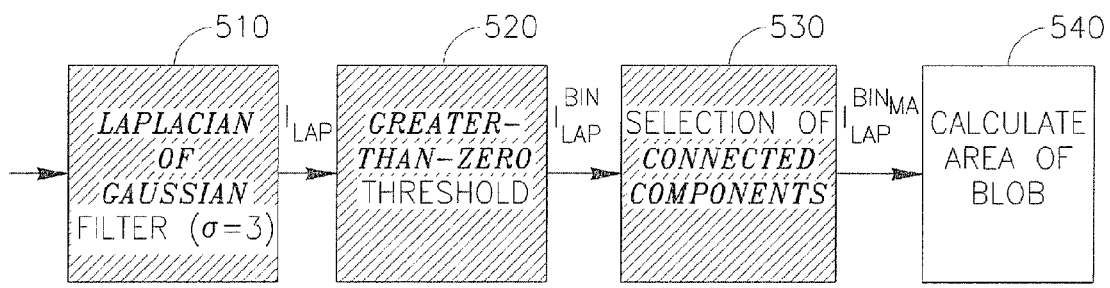
FIG. 5 shows a sample procedure for detection of a lumen area according to an embodiment of the present invention.

Reference is now made to FIG. 5 showing a sample procedure for lumen detection according to an embodiment of the present invention. In block 510, the LoG filter may be applied for example with a sigma value of 3. In block 520 a binary image may be created by means of a greater-than-zero threshold. In block 530, connected components may be labelled. If more than one area and/or blob was detected a selection may be made. In one example, the blob with the highest response of the filter may be selected.

Both wall and tunnel frames may be described by means of the sum of the area of the lumen throughout the image frame sequence of a contractile activity, e.g. a 9 frame image sequence and/or an image sequence captured over a 4-5 second time span. An image frame may be classified as a wall if, for example, the sum of the lumen area throughout the image frame sequence may be less than a pre-defined threshold, while the same frame may be classified as a tunnel frame if, for example, the sum of the lumen area throughout the image frame sequence may be greater than the pre-defined threshold.

According to some embodiments of the present invention, the last stage of the cascade may include a SVM classifier, for example, a SVM classifier with a radial basis functions kernel. This stage may receive as an input the output of a previous stage, e.g. the turbid pruning stage of the cascade, with an imbalance ratio which may be been reduced from approximately 1:50 to 1:5 frames. The output of the SVM classifier may consist of frames and/or frame sequences suggested to the specialist as the candidates for intestinal contraction analysis.

In order to characterize the intestinal contractions, multiple features may be computed. In one example the features may include color features, textural features, blob area features, motion features, etc.

Figure 6:
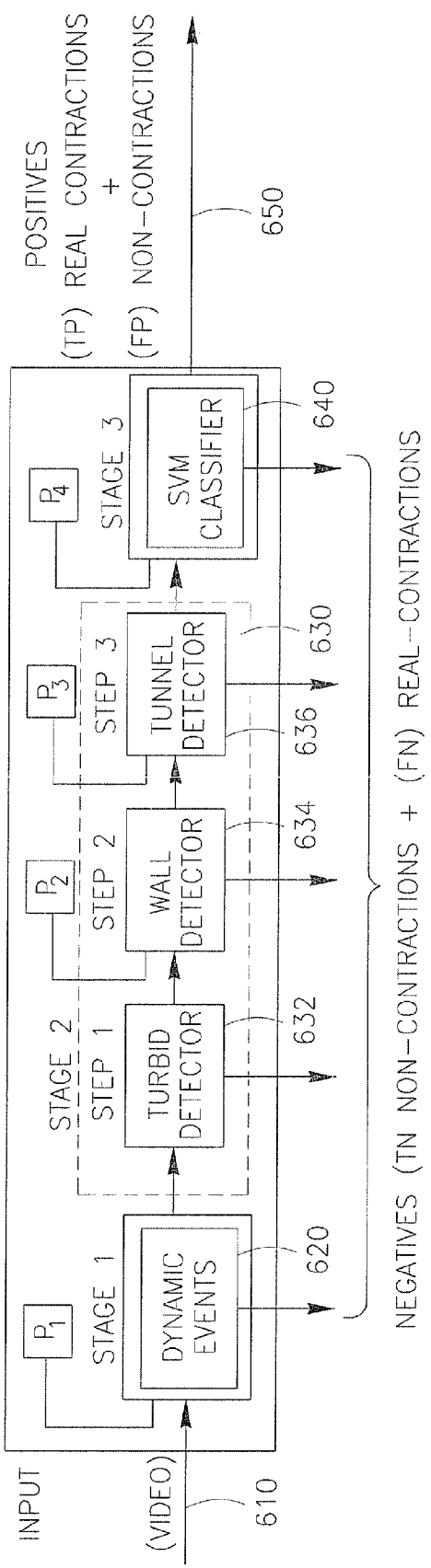
FIG. 6 showing a summary of stages of a cascade for contractile activity assessment according to embodiments of the present invention.

Reference is now made to FIG. 6 showing a summary of stages of a cascade for contractile activity assessment according to embodiments of the present invention. Input to the cascade (block 610) may include an image stream captured along the GI tract and/or a section of the GI tract. Stage one of the cascade (block 620) may include a dynamic event detector. For example, the image stream may be scanned for image frame sequences, e.g. sequences with a pre-defined length, showing a specified and/or predefined dynamic pattern. In one example, the dynamic pattern may be a pattern of global intensity of the image frames in the sequence as may be described herein. Other dynamic motion patterns may be implemented. In stage two of the cascade (block 630) image frames showing poor visibility may be detected and pruned. In some embodiments of the present invention, this stage may include a number of steps. For example stage two may include a turbid detector (block 632) and wall detector (block 634) and a tunnel detector (block 636) as may be described herein. Image frames detected in this stage may be used to reject image frame sequences identified in stage one of the cascade. Stage three of the cascade (block 640) may include a SVM classifier as may be described herein. Output (block 650) of the SVM classifier may consist of frames and/or frame sequences suggested to the specialist as the candidates for intestinal contraction analysis. Other number of stages may be used in the cascade.

Some embodiments may be utilized, for example, to selectively provide automatic or semi-automatic detection of in-vivo images (or frames of an in-vivo image stream), corresponding to contraction(s) and/or contractile activity. Some embodiments, for example, may allow a physician to selectively view and/or rapidly access in-vivo images that correspond to contraction(s), and/or correspond to certain contractile activity (e.g., for diagnosis purposes, to locate or determine a dysfunction in contractile activity, or the like). Some embodiments, for example, may allow shortening of viewing time required by a physician for diagnosis, and/or shortening of time required by a physician to access and/or selectively view in-vivo images that correspond to contraction(s) and/or to contractile activity. Some embodiments, for example, may allow a selective display (or other presentation) of a portion (e.g., a relatively small portion, or multiple small portions) of an in-vivo image stream, which corresponds to contraction(s) and/or to contractile activity. Some embodiments, for example, may allow a physician to determine a portion-of-interest of an in-vivo image stream which the physician may examine, e.g., to detect a portion of an in-vivo image stream which corresponds to contraction(s) and/or contraction activity, for example, for further inspection by the physician. Some embodiments, for example, may allow to "skip" (e.g., by avoiding to display, by fast-forwarding, or the like) one or more portions of an in-vivo image stream based on contractile activity information, e.g., portion(s) that correspond to contractions and/or to contractile activity of interest, portion(s) that do not correspond to contractions and/or to contractile activity of interest, portions that correspond to existence of contractions and/or contractile activity, portions that correspond to absence of contractions and/or contractile activity, or the like. Some embodiments, for example, may allow a physician to concentrate or "focus" his examination of an in-vivo image stream on a portion-of-interest, e.g., based on contraction(s) information and/or other contractile activity information that correspond to the portion-of-interest. Embodiments or the invention may provide various other benefits and/or advantages.

Reference is now made to FIG. 14 showing a schematic illustration of an in vivo imaging WCVE system according to an embodiment of the present invention. In an exemplary embodiment, the system 100 may comprise a device 10 including for example an imaging unit 20 for capturing images in-vivo, a control unit 30, to control functionality of device 10, a power unit 40, a transmitter 50, and antenna 60 for transmitting image and possibly other information to an external recording and/or receiving device 150. In some embodiments, imaging unit 20 may include for example an illumination source for illuminating a body lumen, an imager for capturing image frames in-vivo, an optical system for focusing light onto the imager, and possibly other components. The device 10 may be inserted into the patient by, for example, swallowing, and preferably traverses the patient's GI tract. In some examples, control unit 30 and/or its functionality may not be a separate component and may be incorporated into one or more units. For example control unit 30 and/or its functionality may be incorporated into the imaging unit 20 and/or into the transmitter 50.

Device 10 typically may be or may include an autonomous swallowable capsule, but device 10 may have other shapes and need not be swallowable or autonomous. Embodiments of device 10 are typically autonomous, and are typically self-contained. For example, device 10 may be a capsule or other unit where all the components including for example power components are substantially contained within a container or shell, and where device 10 may not require any wires or cables to, for example, receive power or transmit information. Device 10 may communicate with an external receiving and display system to provide display of data, control, or other functions. For example, in an autonomous system power 40 may be provided by an internal battery or a wireless receiving system. Other embodiments may have other configurations and capabilities. For example, components may be distributed over multiple sites or units. Control information may be received from an external source. In an exemplary embodiment, device 10, may, for example, be an in-vivo imaging device. In other embodiments, device 10 may sense pH or temperature or pressure or some combination of parameters.

Typically, the image capture device may correspond to embodiments described in U.S. Pat. No. 5,604,531 and/or U.S. Pat. No. 7,009,634, but in alternate embodiments other image capturing devices may be used.

Preferably, located outside the patient's body in one or more locations, may be a recorder 150, preferably including an antenna or antenna array 110, an image receiver storage unit 120 and recorder control unit 130 for controlling functionality of recorder 150. In some example, recorder 150 may also include processing capability, for example processing capability may be incorporated in the recorder control unit 130, or may be a separate component. Also located outside the patient's body may be a workstation 160 that may include a data processor 180, a data processor storage unit 190, and a display or an image monitor 170, for displaying, inter alia, the images recorded by the device 10. Other typical components may be included in workstation 160. Preferably, the recorder 150 may be small and portable, and may be worn on the patient's body during recording of the images.

Typically, data processor 14, data processor storage unit 19 and monitor 18 are part of a personal computer or workstation, which includes standard components. Data processor 14 typically, as part of its functionality, acts as a controller controlling the display of the images. Image monitor 18 is typically a conventional video display, but may, in addition, be any other device capable of providing image or other data. The image monitor 18 presents the image data, typically in the form of still and moving pictures, and in addition may present other information. In an exemplary embodiment, the various categories of information are displayed in windows. Multiple monitors may be used to display image and other data. Monitor 18 may be any suitable display, for example, a CRS, LCD display, etc.

In operation, imaging unit 20 may capture images and image data representing, for example, images may be sent to transmitter 41, which transmits images to recorder 150 using, for example, electromagnetic radio waves. Recorder 150 may transfer the image data to image receiver storage unit 120. After a certain period of time of data collection, the image data stored in storage unit 120 may be sent to the data processor 180 or the data processor storage unit 190 of workstation 160. For example, the recorder 150 may be taken off the patient's body and connected to the personal computer or workstation 160 which includes the data processor 180 and data processor storage unit 190 via a standard data link, e.g., a serial or parallel interface of known construction. The image data may then be transferred from the image receiver storage unit 120 to the data processor storage unit 190. Typically, the image stream is stored as a series of images in, for example an image database, which may be implemented in a variety of known manners.

The image data collected and stored may be stored indefinitely, transferred to other locations, manipulated or analyzed. A specialist may use the images to diagnose pathological conditions of the GI tract, and, in addition, the system 100 may provide information about the location of these pathologies. While, using a system 100 where the data processor storage unit 190 first collects data and then transfers data to the data processor 180, the image data may not be viewed in real time, other configurations allow for real time viewing. Data processor 14 operates software (not shown) that, in conjunction with basic operating software such as an operating system and device drivers, controls the operation of data processor 14. Data processor 14 may include graphics software or hardware.

In some embodiments of the present invention, processing of image data may be performed by in-vivo controller 45, receiving unit controller 22, and/or data processor 14. For example some of the stages and or steps of the cascade may be performed in the capsule 40, receiver 12 and/or in the data processor 14.

The image monitor 170 presents the image data, preferably in the form of still and moving pictures, and preferably, may present other information. Multiple monitors 170 may be used to display images and other data. Monitor 170 may be any suitable display, for example, a CRS, LCD display, etc.

Preferably, the in-vivo imaging device 10 may collect a series of still images as it traverses the GI tract, e.g. at 2 frames per second, 7 frames per second, 14 frames per second or other frame rates. The images may be later presented as individual still images, a stream of still images or a moving image of the traverse of the GI tract. The in-vivo imager system may collect a large volume of data, as the device 10 may take several hours to traverse the GI tract, and may record images at a rate of, for example, two images every second, resulting in the recordation of thousands of images. The image recordation rate (or frame capture rate) may be varied.

According to some embodiments of the present invention, detection and marking and/or extraction of image frames in the captured image stream that may include obstructed fields of view may be performed in the workstation after downloading of the data recorded in image receiver 12. In other embodiments, detection may be performed prior to downloading data to the workstation. For example detection may be performed in the image receiver 12 using the processing power that may be included in the recorder, e.g. processing power that may be included as part of controller 45 as may be described herein. In such an example, detected image frames and/or image data obstructed by turbid media may not be included in the data that may be downloaded to the workstation. Downloading time may be reduced in this manner. In another example, detection may be performed within device 10. Processing power may be included for example in the imaging unit 20, the controller 45, the transmitter 41 or in one or more other units. In one example, image frames detected as obstructed data or invalid may not be transmitted to image receiver 12.

In some embodiments of the present invention the functionality of image receiver 12 and the workstation may be combined in a single unit, for example that may be portable. In one example, detection of invalid image frames may be performed in real time and image frames determined to be valid may be displayed in real time. In yet other embodiments detection of invalid image frames may be performed in more than one unit, e.g. partially in image receiver 12 and partially in the workstation.

While, preferably, information gathering, storage and processing is performed by certain units, the system and method of the present invention may be practiced with alternate configurations. For example, the components gathering image information need not be contained in a device, but may be contained in any other vehicle suitable for traversing a lumen in a human body, such as an endoscope, stent, catheter, needle etc.

Example Results

Experimental tests were performed using 10 videos obtained from 10 different fasting volunteers (without eating or drinking in the previous 12 hours to the studio), aged between 22 and 33, at the Digestive Diseases Dept. of the University Hospital Vall D'Hebron in Barcelona, Spain. The endoscope capsules used were developed by Given Imaging, Ltd., Israel. The capsules dimensions were 11×26 mm, contained 6 light emitting diodes, a lens, a colour camera chip, batteries, a radio frequency transmitter, and an antenna. The capsule acquisition rate was two frames per second. For each studio, one expert visualized the whole video and labelled all the frames showing intestinal contractions between the proximal jejunum and the first cecum images. These findings were used as the gold standard for testing the cascade system. Performance results were evaluated for each studio following the leave-one-out strategy: one video was separated for testing while the 9 remaining videos were used for training the SVM classifiers using under-sampling. Finally, the global performance of the cascade system, viewing all the steps in the cascade as a whole black box, may be faced in multiple ways: From a clinical point of view, the number of the existing contractions in the cascade system was able to detect may be assessed, namely, the cascade system sensitivity, how many of the existing non-contractions in the cascade system was able to reject, namely, the cascade system specificity, and finally, which is the ratio between false contractions and real contractions at the output of the cascade system, i.e., the cascade system precision. In addition to the latter, a ratio between the false contractions at the output of the cascade system and the existing contractions in the video may provide useful information (we define this quantity as false alarm rate, FAR)

An overall sensitivity of 69.68%, picking 80% for the studio referred as Video 1 was achieved. The high overall specificity value of 99.59% may be typical of imbalanced problems, and for this reason it may not be generally useful for performance assessment tasks. However, FAR and precision carry out insightful information about what the output is like. The resulting precision value of 59.91% may indicate that 6 out of 10 frames in the output may correspond to true findings. FAR is similar, but in terms of noise (the bigger the FAR, the larger the number of false positives), and normalized by the number of existing contractions. For different videos providing an output with a fixed precision, those with the highest number of findings in video will have lower FAR. In this sense, FAR value of one tells us that we have obtained as many false positives as existing contractions in video.

In addition to the former numerical performance analysis, a more qualitative insight into the different sequences of positives and negatives provided by the cascade system deserves may be provided. The detected contractions may correspond to the paradigm of phasic contractions. For example, clear patterns of the intestinal lumen closing and opening may have been found.

It must be noticed that the presence of turbid liquid in some frames may not result in a rejection of the turbid detector. In one example, only the clearest turbid sequences may be rejected.

Contractions that may have not been detected may share some common features: for example, on the one hand, the open lumen may not always be present at the beginning and the end of the contraction sequence, both because the camera may not have been pointing towards the longitudinal direction of the lumen, or possibly because the selected contraction may spanning over a large number of frames, e.g. 9 frames—this may likely be linked to the blurring definition border between short tonic contractions and phasic contraction.

Moreover, the motion impression that the reviewers and/or health professionals may perceive during the video visualization may not be present in the deployed sequence of frames. Tests were performed consisting in presenting the reviewers with a set of paradigmatic sequences containing doubtful contractions both by visualizing them in the video at a visualization ratio of 3 frames per second, and showing the same sequences deploying the 9 frames. It was found that the reviewers usually labelled a higher number of contractions during the video visualization as compared to looking at the deployed sequence. Motility characterization may be performed in a more subtle detail, in order to detect slight changes in some sequences that may be clear for the reviewers during the visualization process.

False positives analysis was performed. The cascade system was found to detect real contractions which the reviewers did not label. A rough study over the false positives of the ten analyzed videos showed that about 10% of the false positives consisted of sequences that the reviewers missed. Lateral movement of the camera while focusing on the lumen, shadows due to for example differences in illumination, and the residual presence of patterns of turbid liquid, shared the main responsibility in the false positives.

According to embodiments of the present invention an automatic detection system of intestinal contractions may detect image frames including contractile activity, for example using in-vivo image frames of a body lumen obtained from capsule video endoscopy. Other imaging devices and systems may be used. According to embodiments of the present invention the system may be based on sequential stages of image processing. In one example, the sequential stages may allow a reviewer to identify different features related to intestinal motility in an image stream, such as for example, the presence of high content of intestinal juices which may hinders the video visualization or the detection of spans of time with no motility activity. Using this modular perspective, domain knowledge may be easily added to the system by the reviewer by means of the inclusion of new sequential stages to the cascade.

In some examples, rejecting negatives in a sequential way may provide a useful strategy to dealing skewed distribution of positives i.e. contractions, and negatives i.e. non-contractions, along the video data.

Endoluminal image and displacement analysis may be a useful non-invasive tool to diagnose patients with severe small bowel dysmotility. According to embodiments of the present invention parameters that best discriminate patients with intestinal dysmotility from healthy subjects were identified. In one example, the number of contractions and the frequency of the contractions may be used to discriminate between patients with intestinal dysfunction, e.g. small bowel dysmotility from healthy subjects. In one embodiment of the present invention, contractions may be defined as partial or total luminal occlusion. In one example a distinction may be made between contractions with partial or total luminal occlusion. In another example, velocity and/or speed of the in-vivo device may be defined as one parameter to discriminate between patients with intestinal dysfunction and healthy subjects. In another example the presence, frequency, and/or quantity of captured images showing tunnel images, e.g. static tunnel images that may reflect quiescence may be used to discriminate between patients with intestinal dysfunction and from healthy subjects. Tunnel images may be defined as images showing, for example an open lumen as a static blob area. According to one embodiment of the present invention, tunnel images may be detected using for example Laplacian filtering. In another example, the presence, quantity and other defining characteristics of secretory component may be used to discriminate between patients with intestinal dysfunction and healthy subjects. According to one embodiment of the present invention, secretion may be identified and/or characterized using color histogram analysis, for example, based on self organizing maps using, for example, a support vector machine. Other methods may be used to detect and characterize the secretory component. One or more parameters may be defined in fasting conditions and/or postprandial. Other parameters may be used in addition and/or instead of the parameters described herein. A combination and/or accumulation of parameters may be used.

According to one embodiment of the present invention, a device, system and method is provided to evaluate intestinal motor activity including manometrically silent events based on analysis of endoluminal images.

According to one embodiment of the present invention, a processor, e.g. a workstation, that may include a semi-supervised computer program, may be used to analyze endo-luminal images of for example the gastro-intestinal (GI) tract.

According to embodiments of the present invention, endoluminal image and displacement analysis may be used to identify abnormal parameters of motor function, establishing an objective, non-invasive, positive diagnosis in patients with small bowel motility disorders.

Experimental Study I

Fifteen patients with chronic intestinal pseudo-obstruction (9 F, 6 M; 25-64 yrs age range) diagnosed by manometric criteria (n=9), full thickness biopsy (n=2) or both (n=4). Fifteen healthy subjects (6 F, 9 M; 19-30 yrs age range). Pillcam capsule (Given Imaging) was administered to all the participants.

The images of the small bowel emitted by the Pillcam capsule were recorded by external detectors fixed to the abdominal wall. When the capsule reached the jejunum, a test meal (Ensure HN 300 ml, 1 kcal/ml) was ingested.

Patients generally feature: 1. reduced contractility, 2. slower velocity, 3. frequent images of static tunnel reflecting quiescence, 4. more static luminal fluid and 5. impaired postprandial response with blunted postprandial increment in contractility and propulsion (*$p<0.05$).

Parameters were combined to achieve optimal discrimination between patients and controls.

Best discrimination was obtained when at least 2 variables were outside the normal range, achieving a sensibility of 93% and a specificity of 87%.

Experimental Study 2

Twenty six healthy subjects were studied modelling two experimental conditions:

prokinetic stimulation, induced by ingestion of a meal (Ensure HN, 300 ml, 1 kcal/ml; n=13)

motor inhibition, induced by glucagon administration (4.8 µg/kg bolus plus 9.6 µg/kg h infusion for 1 h; n=5)

basal conditions, as control (fasting; n=8)

The meal stimulus increased the number of contractions, while motor inhibition suppressed contractile activity as compared to basal conditions. Propulsion of the capsule increased by 118% during prokinetic stimulation, and decreased by 73% during inhibition. During motor inhibition the percentage of time when the capsule was completely still was much longer than during basal conditions. Conversely, prokinetic stimulation reduced the time during which the gut presented a static tunnel appearance. Prokinetic stimulation reduced the tone of appearance of endoluminal secretions.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for automatic assessment of contractile activity in a gastrointestinal (GI) tract, comprising:
    identifying an image frame sequence, said image frame sequence comprising a plurality of frames from an image stream captured along the GI tract;
    detecting a lumen area in image frames of said image frame sequence;
    detecting a dynamic event in the image frame sequence, the dynamic event showing a specified dynamic pattern related to the detected lumen area; and
    classifying the image frame sequence as a candidate corresponding to an intestinal contraction.

2. The method of claim 1 comprising displaying a portion of the in-vivo image stream which corresponds to contractile activity.

3. The method of claim 1 comprising detecting wall frames, the wall frames captured while the in-vivo imaging device is focused on the GI lumen wall.

4. The method of claim 3 comprising classifying an image frame as a wall frame if the lumen area throughout the image frame sequence is less than a pre-defined threshold.

5. The method of claim 1 comprising detecting tunnel frames, the tunnel frames depicting a static appearance of the GI lumen for a sequence of time.

6. The method of claim 5 comprising discriminating between patients with intestinal dysfunction and healthy subjects based on the presence, frequency, and/or quantity of captured images showing tunnel images.

7. The method of claim 5 comprising classifying an image frame as a tunnel frame if the lumen area throughout the image frame sequence is greater than a pre-defined threshold.

8. The method of claim 1 comprising identifying the number of contractions along the GI lumen.

9. The method of claim 1 comprising identifying the frequency of contractions along the GI lumen.

10. The method of claim 1 comprising detecting partial luminal occlusion and total luminal occlusion.

11. The method of claim 1 comprising detecting frames in the image frame sequence with poor visibility or obstructed by turbid media, and removing these frames from the image frame sequence.

12. The method of claim 1 wherein the lumen area is detected by applying a Laplacian filter to an image frame, and creating a binary image using a greater-than-zero threshold.

13. A system for automatic assessment of contractile activity in a GI tract, comprising:
    a storage unit to store image frames of an image stream captured along the GI tract;
    a processor to:
        select an image frame sequence, said image frame sequence comprising a plurality of frames from the image stream;
        detect a lumen area in image frames of said image frame sequence;
        detect a dynamic event in the image frame sequence, the dynamic event showing a predefined dynamic pattern related to the detected lumen area; and
        classify the image frame sequence as a candidate corresponding to an intestinal con traction.

14. The system of claim 13 comprising a display to display a portion of the in-vivo image stream which corresponds to contractile activity.

15. The system of claim 13 wherein the processor is to detect wall frames captured while the in-vivo imaging device is focused on the GI lumen wall.

16. The system of claim 15 wherein the processor is to classify an image frame as a wall frame if the lumen area detected throughout the image frame sequence is less than a pre-defined threshold.

17. The system of claim 13 wherein the processor is to detect tunnel frames, the tunnel frames depicting a static appearance of the GI lumen for a sequence of time.

18. The system of claim 17 wherein the processor is to discriminate between patients with intestinal dysfunction and healthy subjects based on the presence, frequency, and/or quantity of captured images showing tunnel images.

19. The system of claim 17 wherein the processor is to classify an image frame as a tunnel frame if the lumen area throughout the image frame sequence is greater than a pre-defined threshold.

20. The system of claim 13 wherein the processor is to detect partial luminal occlusion and total luminal occlusion.

* * * * *